April 7, 1925.                                              1,532,219
E. ANTHONY
CONTROLLER FOR ELECTRICALLY HEATED FLATIRONS
Filed Nov. 29, 1920
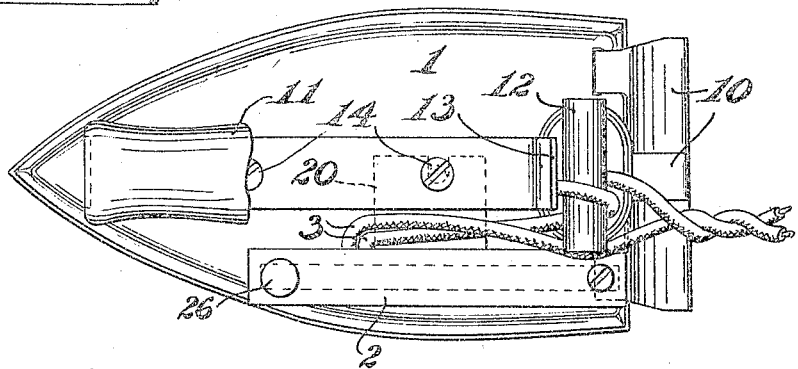
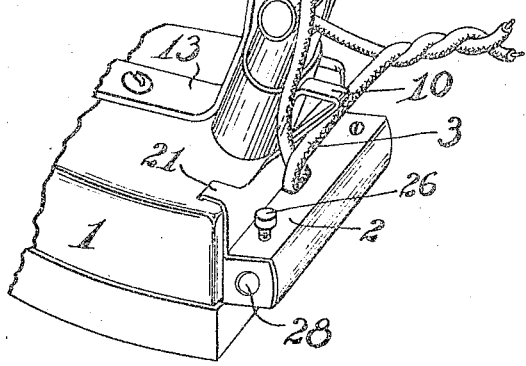
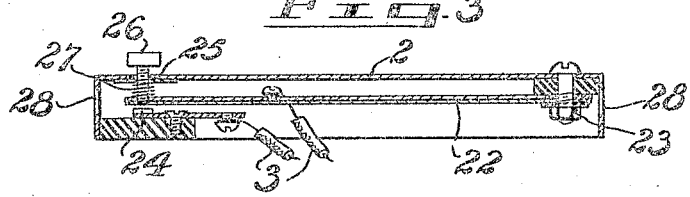
INVENTOR
Eugene Anthony
BY
ATTORNEYS Patented Apr. 7, 1925.

1,532,219

UNITED STATES PATENT OFFICE.

EUGENE ANTHONY, OF NEAR SEATTLE, WASHINGTON.

CONTROLLER FOR ELECTRICALLY-HEATED FLATIRONS.

Application filed November 29, 1920. Serial No. 427,261.

*To all whom it may concern:*

Be it known that I, EUGENE ANTHONY, a citizen of the United States, and resident of near Seattle, in King County, in the State of Washington, have invented certain new and useful Improvements in Controllers for Electrically-Heated Flatirons, of which the following is a specification.

My invention relates to electrically-heated flatirons, and particularly to the means for controlling the heat thereof.

The object of my invention is to provide means, either permanently connected to the flatiron or attachable at will thereto, whereby the heat or the flatiron itself will act upon a thermostatic bar or other control device to cut off the electric current when the proper temperature is reached.

Another object of my invention is to provide a simple, cheap, and effective form of control device for such flatirons.

My invention comprises those novel parts and combinations thereof which are shown in the accompanying drawings, described in the specification, and particularly defined in the claim terminating the same.

In the accompanying drawings I have shown my invention in forms which are now preferred by me.

Figure 1 is a plan view of a flatiron, embodying one form of my invention, a part of the handle being broken away.

Figure 2 is a perspective view of the rear end of a flatiron, illustrating an alternative embodiment of my invention.

Figure 3 is a longitudinal sectional view through a form of thermostatic control member which I prefer to employ.

The flatiron itself may be of any suitable or ordinary form. In Figure 1 I have illustrated a flatiron comprising the body 1, the rear support 10, the handle 11, and the electric plug 12. In this form the handle bracket 13 is held in place by screws 14 which are threaded into the body 1. My thermostatic control device is secured within a suitable casing 2, which may be formed as shown in detail in Figure 3.

In the form shown in Figure 1, this casing 2 is provided with a laterally-extending yoke 20, which is adapted to span a screw 14, and to be held thereby against the heated body 1 of the flatiron. In the form shown in Figure 2, the flatiron, instead of having a rear support as in Figure 1, has secured thereto the casing 2, in position to act as the rear support, which in this case is attached to the body 1 by suitable fingers 21. The two constructions are otherwise alike. In the first instance the thermostatic control device may be detached from the flatiron at will, while in the second case it is formed as an integral part thereof.

In the preferred form of my control device, as shown in detail in Figure 3, the casing 2 is enclosed on all sides but one, this side being open throughout its length, or for a considerable portion thereof. This side is intended to be placed adjacent the heated body 1 of the flatiron. Within the casing, and extending adjacent the open side thereof, and the heated body of the flatiron, is a thermostatic bar 22 of any suitable construction. This is secured by one end, as at 23, and a fixed contact point 24 is positioned within the casing spaced therefrom, preferably adjacent the opposite end of the bar 22. Wires 3, in the electric circuit leading to the heating element within the body 1, are secured respectively to the bar 22 and to the fixed terminal 24. The bar 22 thus forms one terminal of a switch controlling the supply of current to the heating element, the two terminals being normally in electrical contact.

Means are provided for holding these two terminals normally in contact, and for regulating the amount of force required to separate them, in this manner controlling the degree of temperature required to break the supply circuit. I have shown a screw 25 threaded in the free end of the bar 22, and extending outside of the casing 2, and having an insulated head 26 thereon. A spring 27, interposed between the casing 2 and the bar 22, normally holds the terminals in contact, in this case the end of the screw 25 acting as one contact point. By adjusting the screw 25 the compression of the spring 27 is varied, thus regulating the temperature required before contact is broken between the screw and the point 24. Contact is broken when the heat of the body 1, communicated to the bar 22 through the open side of the casing 2, has generated sufficient force in the thermostatic bar 22 to raise it against the force of the spring 27. When this occurs, the supply current to the iron is cut off, until the body cools off somewhat. The end of the casing 2 may be perforated as shown at 28, if desired, to permit inspection of the relative positions of the parts, and to permit a certain amount of air circulation therethrough. This makes the control member sensitive to slight variations in temperature, and assists in maintaining an even working temperature.

What I claim as my invention and desire to secure by Letters Patent of the United States is:—

An electrically heated flat iron having a hollow casing member secured to and extending across the rear end of the iron above its bottom face and adapted to serve as a supporting member when the iron is turned up and also as a container for a current regulating device, and a thermostatically operated current regulator in said casing.

Signed at Seattle, Washington, this 9th day of November, 1920.

EUGENE ANTHONY.